United States Patent Office 2,718,856
Patented Sept. 27, 1955

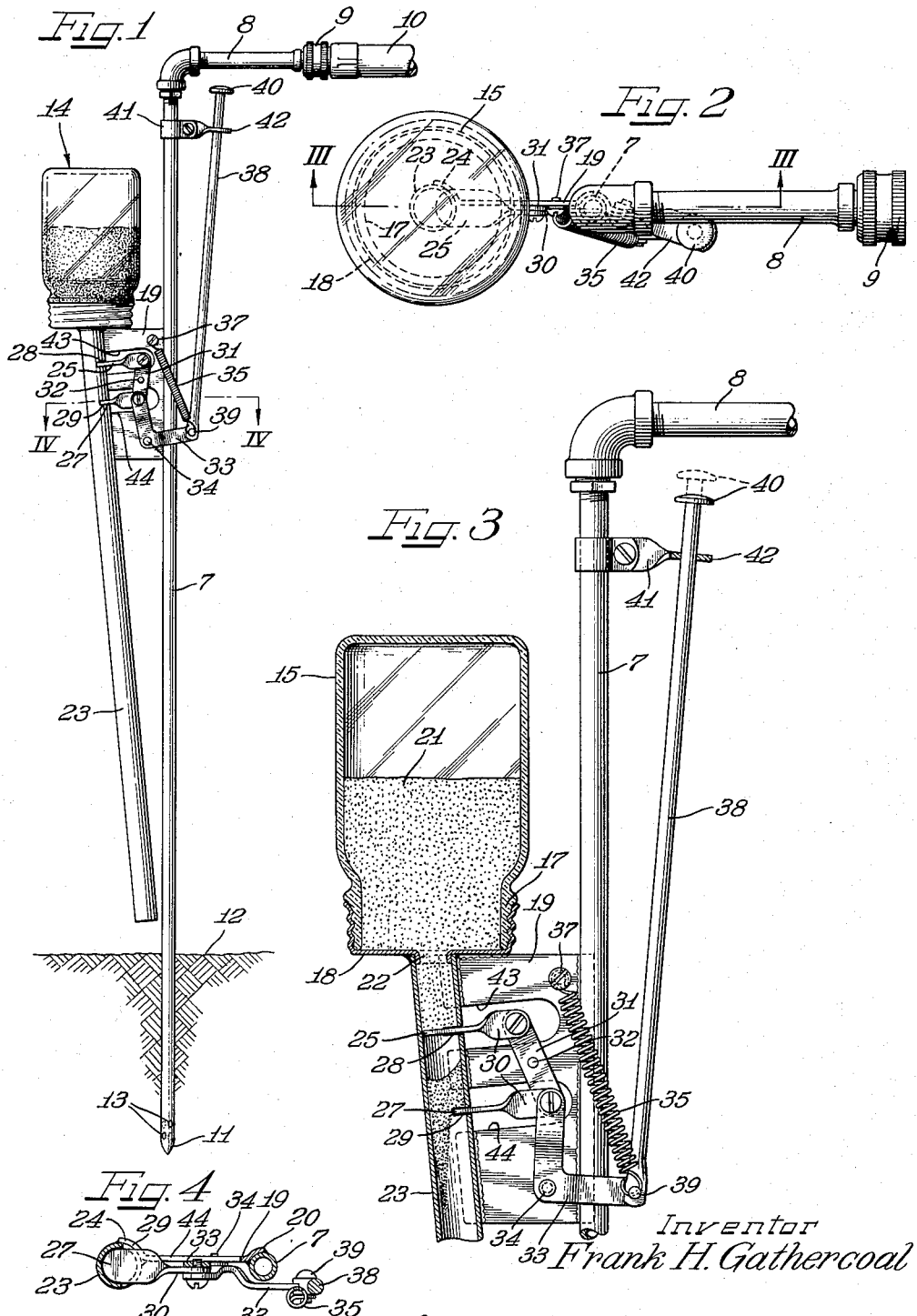

2,718,856

MATERIAL DISPENSER

Frank H. Gathercoal, Corvallis, Oreg., assignor to Joseph D. Gathercoal, Wilmette, Ill.

Application April 19, 1951, Serial No. 221,778

7 Claims. (Cl. 111—7.1)

The present invention relates to improvements in the conditioning and treatment of soil about or adjacent to growing plants.

An important object of the present invention is to provide an improved means for treating the soil about or adjacent to growing plants.

Another object of the invention is to provide a device for subsoil irrigation and the application of a measured quantity of a free-flowing material to the irrigated area.

A further object of the invention is to provide a handy, portable gardener's hand-operated appliance for subsoil irrigation and surface application of free-flowing treatment material.

A still further object of the invention is to provide a novel material dispenser including improved means for dispensing controlled charges of material from a container under manual operation.

Other objects, features and advantages of the present invention will be readily apparent from the following detailed description of a preferred embodiment thereof taken in conjunction with the accompanying drawings, in which:

Figure 1 is a side elevational view of a combination subsoil irrigation and material applying appliance embodying the features of the present invention;

Figure 2 is an enlarged top plan view of the appliance of Fig. 1;

Figure 3 is a fragmentary vertical sectional detail view, with parts in elevation, taken substantially on the line III—III of Fig. 2 and showing the material-controlling valve structure as it appears when a charge of the material is being deposited; and Figure 4 is a transverse sectional detail view taken substantially on the line IV—IV of Fig. 1.

An appliance according to the present invention comprises an elongated pipe body member 7 which for purpose of light weight and efficiency is preferably of as small a diameter as practicable for the use to which the appliance is to be put. The length of the body pipe 7 is preferably such that it can be used by an adult of average height conveniently and without stooping and without unusual manual or muscular effort. At its upper end the pipe body 7 has an angularly disposed pipe handle portion 8 carrying a terminal swivel connector 9 by which a water hose 10 is detachably connectable to the appliance. At its lower end the pipe body 7 has a pointed earth penetrating tip 11 which serves also as a lower end closure for the pipe bore.

Subsoil irrigation is effected by manipulating the pipe body 7, as by means of the tubular water conducting handle 8, to force the lower pointed end portion 11 of the irrigator into a body of soil 12 to a predetermined depth. Water from a suitable source conducted to the device through the flexible hose 10 issues from a plurality of small discharge ports 13 located immediately above the pointed tip 11 and directed in uniformly spaced and distributed radial directions from the pipe body 7 so that the water is forced substantially uniformly into the surrounding soil.

After the soil into which the pipe member 7 has been driven has become saturated to the extent that water backs up onto the surface of the soil 12 about the area surrounding the pipe 7, a charge of free-flowing material is applied to the wet surface of the soil from an applicator 14 carried by the pipe body 7. In the present instance the applicator 14 is shown as adapted for supporting a supply of finally divided material such as fertilizer, insecticide, or fungicide, or a combination thereof for application by predetermined quantities or charges, but it will be readily apparent that if desired the applicator 14 can be equipped to apply material in solution or liquid form.

In the construction shown, the material applicator 14 comprises a material container 15 which is preferably in the form of a transparent jar made from plastic or glass and provided with a neck 17 for detachable engagement with a supporting head member 18 which may be in the form of an inverted screw cap into which the neck 17 of the jar is adapted to be threadedly engaged.

The head member 18 is fixedly supported upon the pipe body 7 through the medium of a bracket member 19 in the form of a vertical plate having a longitudinal edge flange formation 20 shaped complementary to the external surface of the pipe 7 and secured thereto as by soldering, brazing, or welding. The bracket plate 19 projects laterally from the body pipe 7 and has the head member 18 secured to the upper edge thereof in spaced relation to the body pipe 7 to facilitate attachment or removal of the material containing jar 15 (Figs. 1, 3 and 4).

Finely divided, dry free-flowing material 21 supported within the jar 15 and on the head 18 is adapted to flow downwardly through an opening 22, preferably located centrally in the head 18. From the delivery port or opening 22, the material flows down into a delivery tube 23 which is secured to the underside of the head member 18 and to the outer margin of the bracket plate member 19 which for this purpose may be provided with a complementary outer marginal flange formation 24 soldered, welded or brazed to the delivery pipe 23. By preference the supporting bracket 19 is located on the upper portion of the body pipe member 7 and the delivery pipe or tube 23 is directed in inclined relation toward the lower end portion of the body pipe 7 with the lower discharge end of the delivery tube located close to the body pipe member but spaced a substantial distance above the tip 11 of the body pipe member so that when the body pipe member is in subsoil irrigating position the discharge tip of the delivery tube will be at least moderately spaced above the surface of the soil, substantially as shown in Fig. 1.

For controlling discharge of the material 21, valve mechanism is provided which is preferably of such form as to control the discharge of the material by predetermined or measured charges. To this end the valve means comprises a pair of plunger blade valve members 25 and 27 operatively disposed in vertically spaced relation in material flow controlling relation to the upper portion of the delivery tube 23. The valve member 25 extends operatively into the tube 23 through a slot 28 while the valve member 27 extends operatively into the tube member through a similar slot 29 spaced a predetermined distance below the slot 28. While the operative valve portions of the members 25 and 27 are disposed in planes normal to the axis of the tube 23, the outer portions of the valve members have preferably vertically coplanar respective attachment or pivot ear portions 30 which are pivotally connected to the respective opposite end portions of a coordinating lever 31. A pivot pin 32 intermediately pivotally secures the coordinating lever 31 to the bracket plate 19. Through this arrangement it will be apparent that pivoting of the lever 31 causes the valve members 25 and 27 to be moved alternately into and out of material flow blocking relation to the passage in the delivery tube 23. As shown in Figs. 1, 2 and 4 the upper valve member 25 is retracted from flow blocking relation and the lower valve member 27 is protracted into flow blocking relation to the delivery tube passage so that the material 21 can flow down into the longitudinal area or space between the valve members in the delivery tube. By reversing the position of the valve members as shown in Fig. 3, the upper valve member 25 enters into blocking relation and the lower valve member 27 is withdrawn from blocking relation so that the flow of material from the container 15 is blocked but the material in the space between the two valve members can escape and flow down the delivery tube 23 for discharge onto the surface of the irrigated soil. It will be observed from Figs. 2 and 4 that the tips of the valve members 25 and 27 are formed arcuately complementary to the inner wall of the tube member 23 so as to effect a substantial sealing engagement therewith.

Means are provided for normally maintaining the valve members 25 and 27 in the position wherein the lower valve member 27 blocks flow of material from the tube 23. To this end, a bell crank lever 33 is intermediately pivotally connected as by means of a pivot pin 34 to the lower portion of the bracket plate 19 with one arm extending upwardly and connected pivotally to the lower end portion of the coordinating lever 31 while the other arm of the bell crank lever projects past the body pipe 7. To the distal end portion of the laterally extending arm of the bell crank 33 is connected a tension spring 35, the other end of which is anchored as indicated at 37 to the upper portion of the bracket member 19. The spring 35 normally draws the lateral arm of the bell crank 33 upwardly and thus normally maintains the coordinating lever 31 rocked to the position shown in Fig. 1 wherein the lower valve member 27 is in flow blocking relation in the delivery tube 23 and the upper valve member 25 is withdrawn from the flow blocking relation so that a charge of material is supported in the space between the two valve members.

When a charge of material is to be delivered down the tube 23, manual means in the form of an upwardly extending operating rod 38 are actuated to rock the bell crank lever 33 and correspondingly rock the coordinating lever 31 into the relationship shown in Fig. 3. For this purpose the operating rod 38 is pivotally connected at its lower end as by means of a pin 39 to the distal end portion of the lateral arm of the bell crank 33, and the upper end portion of the operating rod 38 carries a button or knob 40 located conveniently under the handle portion 8 so that finger or thumb pressure applied to the knob 40 to push the operating rod from the dash outline position shown in Fig. 3 into the full line position will effect rocking of the levers to operate the valve members.

For retaining the upper portion of the operating rod 38 in operative position a bracket member 41 is attached to the upper portion of the body pipe 7 and has a guide eye 42 through which the rod 38 extends slidably.

To provide operative clearance for the valve members 25 and 27, the bracket plate 19 is preferably formed with clearance slots or apertures 43 and 44, respectively.

It will thus be apparent that in the operation of the appliance, after the soil area into which the pipe body 7 has been driven is sufficiently irrigated to show water on the surface of the soil, downward movement of the operating rod 38 causes coordinated movement of the control valves 25 and 27, through rocking of the connected bell crank 33 and the coordinating lever 31 to release a predetermined charge of the material 21 down the delivery tube 23. The material drops from the elevated lower end of the delivery tube 23 onto the surface of the ground adjacent to and about the pipe body 7. The amount of material 21 to be deposited in any one location is thus easily controlled.

It will be understood that modifications and variations may be effected without departing from the scope of the novel concepts of the present invention.

I claim as my invention:

1. In combination in an appliance of the character described, an elongated rigid pipe member, a bracket carried by the upper portion of said pipe member, a material container structure carried by said bracket, a delivery tube extending from said material container and arranged to discharge toward the lower end of the pipe member, a pair of relatively oppositely operable cut-off valves in spaced relation in the upper portion of said tube, a coordinating lever carried by said bracket and operable rockably to alternately retract and protract said cut-off valve members in synchronized relation, and manually operable means for actuating said lever, said actuating means including a bell crank lever mounted on said bracket and pivotally attached at one end to said coordinating lever.

2. In combination in an appliance of the character described, an elongated rigid pipe member, a bracket carried by the upper end portion of said pipe member, a material container structure carried by said bracket, a delivery tube extending from said material container and arranged to discharge toward the lower end of the pipe member, a pair of relatively oppositely operable cut-off valves in spaced relation in the upper portion of said tube, a coordinating lever carried by said bracket and operable rockably to alternately retract and protract said cut-off valve members in synchronized relation, and manually operable means for actuating said lever, said actuating means including a bell crank lever mounted on said bracket and pivotally attached at one end to said coordinating lever and an actuating rod attached to the opposite end of said bell crank member for manual actuation.

3. In combination in an appliance of the character described, an elongated rigid pipe member, a bracket carried by the upper end portion of the pipe member, a treatment material supply container supported by the bracket, a delivery pipe extending from said container, a pair of spaced slots in said pipe opening toward said bracket, respective slidable cut-off valves operatively extending through said slots, a coordinating lever pivotally mounted on said bracket, said valve members being pivotally attached to opposite ends of the coordinating lever, a bell crank lever connected to one end of the coordinating lever, means pivotally connecting the bell crank lever to said bracket, a biasing spring normally urging the bell crank lever into one operative position and thereby urging the coordinating lever into one operative position in which the lower of said valve members is in material flow blocking relation within said tube, and a manual operating member connected to said bell crank member for rocking the same in opposition to said biasing spring to rock said coordinating lever and withdraw the lower of said valve members from blocking relation within the tube and to extend the upper of said valve members into blocking relation within the tube.

4. In combination in an appliance of the character described, an elongated rigid pipe member having a handle structure on the upper end thereof, a bracket carried by the upper portion of said pipe member, a material container structure carried by said bracket, a delivery tube extending from said material container and arranged to discharge toward the lower end of the pipe member, a pair of relatively oppositely operable cut-off valves in spaced relation in the upper portion of said tube, a coordinating lever carried by said bracket and operable rockably to alternately retract and protract said cut-off valve members in synchronized relation, manually operable means for actuating said lever, said actuating means including a bell crank lever mounted on said bracket and pivotally attached at one end to said coordinating lever, an operating plunger connected to said bell crank lever and extending adjacent to said handle structure for manipulation, and a guide bracket carried by said pipe member for guiding said plunger reciprocably.

5. In combination in an appliance of the character described, an elongated rigid pipe member, a bracket carried by the upper portion of said pipe member, a material container structure carried by said bracket, a delivery tube extending from said material container and arranged to discharge toward the lower end of the pipe member, a pair of relatively oppositely operable cut-off valves in spaced relation in the upper portion of said tube, a coordinating lever carried by said bracket and operable rockably to alternately retract and protract said cut-off valve members in synchronized relation, manually operable means for actuating said lever, said actuating means including a bell crank lever mounted on said bracket and pivotally attached at one end to said coordinating lever, said bracket comprising a fin-like plate secured in longitudinally relation on and between said pipe member and said delivery tube and supporting the material tube in substantially converging relation to the lower end portion of the pipe member.

6. In combination in a material dispenser, an elongated rigid pipe member, a fin-like bracket plate secured in longitudinal relation on an upper portion of said pipe member, a delivery tube shorter than said pipe member and secured to the bracket plate in spaced relation to the pipe member and converging at its lower end toward the lower end portion of the pipe member, a material container carried at the upper end of and discharging into said tubular member, said bracket plate having spaced recesses therein registering with longitudinally spaced openings in the tubular member, respective relatively oppositely operable cut-off valves located in said recesses and extending into said openings, a coordinating lever carried by said bracket plate and operable rockably to alternately retract and protract said cut-off valve members in synchronized relation, a bell crank lever mounted on said bracket plate and pivotally attached at one end to said coordinating lever, and manually operable means for actuating said bell crank lever.

7. In combination in an appliance of the character described, an elongated rigid pipe member, a bracket carried by the upper portion of said pipe member, a material container structure carried by said bracket, a delivery tube extending from said material container and arranged to discharge toward the lower end of the pipe member, a pair of relatively oppositely operable cut-off valves in spaced relation in the upper portion of said tube, a coordinating lever carried by said bracket and operable rockably to alternately retract and protract said cut-off valve members in synchronized relation, manually operable means for actuating said lever, said actuating means including a bell crank lever mounted on said bracket and pivotally attached at one end to said coordinating lever, and a biasing spring connected at one end to said bracket and at its opposite end to the end of said bell crank lever opposite to the end which is connected to said coordinating lever for normally biasing the bell crank lever and thereby said coordinating lever and said cut-off valves into one operative relationship thereof and from which the same can be moved into the opposite operative relationship by rocking the bell crank lever in opposition to said spring.

References Cited in the file of this patent

UNITED STATES PATENTS

| | | |
|---|---|---|
| 437,563 | Burchfield | Sept. 30, 1890 |
| 445,510 | Black | Jan. 27, 1891 |
| 468,346 | Johnson | Feb. 9, 1892 |
| 749,758 | Templeton | Jan. 19, 1904 |
| 835,988 | Swartz | Nov. 13, 1906 |
| 1,113,056 | Schick et al. | Oct. 6, 1914 |
| 1,205,036 | Settevig | Nov. 14, 1916 |
| 1,281,991 | Menendez | Oct. 15, 1918 |
| 1,306,547 | Lyon | June 10, 1919 |
| 1,375,430 | Walker | Apr. 19, 1921 |
| 1,604,189 | Nelson | Oct. 26, 1926 |
| 1,939,939 | Worrell | Dec. 19, 1933 |
| 2,083,153 | Irish | June 8, 1937 |
| 2,240,859 | Rice | May 6, 1941 |
| 2,299,378 | Cain | Oct. 20, 1942 |
| 2,546,317 | Prizer | Mar. 27, 1951 |
| 2,611,514 | Peyton | Sept. 23, 1952 |

FOREIGN PATENTS

| | | |
|---|---|---|
| 17,764/10 | Australia | Apr. 29, 1910 |
| 83,632 | Switzerland | May 17, 1920 |